United States Patent [19]

Kobayashi et al.

[11] Patent Number: 5,371,164

[45] Date of Patent: Dec. 6, 1994

[54] ROOM-TEMPERATURE CURABLE POLYORGANOSILOXANE COMPOSITION

[75] Inventors: Fumihiko Kobayashi; Shigeki Matsushita; Kazuhisa Ono; Tsuneo Motegi, all of Tokyo, Japan

[73] Assignee: Toshiba Silicone Co., Ltd., Tokyo, Japan

[21] Appl. No.: 82,461

[22] Filed: Jun. 25, 1993

[30] Foreign Application Priority Data

Jul. 2, 1992 [JP] Japan ................................. 4-175208
Jun. 15, 1993 [JP] Japan ................................. 5-143182

[51] Int. Cl.$^5$ ............................................. C08G 77/06
[52] U.S. Cl. ......................................... 528/18; 528/15; 528/19; 528/34; 528/901
[58] Field of Search ................. 528/34, 901, 15, 19, 528/18

[56] References Cited

U.S. PATENT DOCUMENTS

| 4,011,360 | 3/1977 | Walsh | 428/402 |
| 4,536,540 | 8/1985 | Dziark | 528/34 |
| 4,720,531 | 1/1988 | Chung et al. | 528/34 |

FOREIGN PATENT DOCUMENTS

| 0206301 | 12/1986 | European Pat. Off. | |
| 0317765 | 5/1989 | European Pat. Off. | |
| 58-501040 | 6/1983 | Japan | C08L 83/06 |
| 59-500219 | 2/1984 | Japan | C08L 83/06 |
| 60-123552 | 7/1985 | Japan | C08L 83/04 |
| 60-135458 | 7/1985 | Japan | C08L 83/06 |

*Primary Examiner*—Melvyn I. Marquis
*Attorney, Agent, or Firm*—Sughrue, Mion, Zinn, Macpeak & Seas

[57] ABSTRACT

A room-temperature curable polyorganosiloxane composition comprising the following components (A) to (C): (A) 100 parts by weight of (1) a mixture of a terminally reactive polyorganosiloxane represented by the formula $R^1{}_a(R_2O)_{3-a}SiZ[R_2SiO]_nSiR^1{}_2ZSi(OR^2)_{3-a}R^1{}_a$; (2) a silane represented by the formula $R^3{}_bSi(OR^4)_{4-b}$ or a partially hydrolyzed condensation product thereof; the amount of (A) (1) being from 85 to 100 parts by weight; (B) from 0.01 to 20 parts by weight of a curing catalyst; and (C) from 0.5 to 20 parts by weight of a polycondensation reaction product of an amino group-containing silane represented by the formula $X_cSi(WNH_2)Y_{3-c}$ and a silazane represented by the formula $X_dY_{3-d}SiNHSiY_{3-d}X_d$; where all symbols are defined in the specification.

7 Claims, 1 Drawing Sheet

ROOM-TEMPERATURE CURABLE POLYORGANOSILOXANE COMPOSITION

FIELD OF THE INVENTION

The present invention relates to a polyorganosiloxane composition, and in particular to a room-temperature curable polyorganosiloxane composition which is stable under a closed state free from humidity, is cured at room temperature by contact with the moisture in air to change into an elastic body, has a rapid curing property, has no corrosive property to various metals including copper series metals, and has less possibility of causing electric contact hindrance.

BACKGROUND OF THE INVENTION

In polyorganosiloxane compositions forming rubbery elastic bodies by curing at room temperature, the composition of the type which undergoes a curing reaction by contact with the moisture in air does not involve complicated procedures such as weighing a base polymer, a crosslinking agent or a catalyst, or mixing them directly before use, and thus involves no problem in compounding, and is excellent in adhesive property. Therefore, such a polyorganosiloxane composition has been widely used as elastic adhesives or coating materials in the electric and electronic industries and also as a sealant, etc., for buildings.

Such a polyorganosiloxane composition is generally composed of a silanol group-terminated polydiorganosiloxane, wherein the terminals of the molecule are blocked with hydroxyl groups, compounded with a crosslinking agent having on the average more than 2 hydrolyzable groups in the molecule and according to the kind of the crosslinking agent used, the composition releases a carboxylic acid (e.g., acetic acid), an organic amine, an amide, an organic hydroxylamine, an oxime compound, an acetone, etc., upon curing.

In those compositions, the composition releasing acetic acid exhibits excellent in adhesive properties and curing properties, but in the case of using that composition, there are problems in that care must be taken as to the irritative odor generated can make the working environment unpleasant. Further, when an article to which the composition is applied is a metal, some way to prevent corrosion is necessary to prevent the metal from being rusted.

When a composition which releases a long chain carboxylic acid is used, there is no problem in generating irritating odors but it is difficult to prevent rusting of metals, in particular, rusting of metals after they are immersed in water.

Similarly, in the amine-releasing type composition, there is a problem in that the amine released has a strong odor and can be toxic, and in the hydroxylamine-releasing type, oxime-releasing type, and amide-releasing type compositions, there is a problem in that they are liable to rust metals, in particular copper and copper alloys. Furthermore, the acetone-releasing type composition is cured quickly and does not have a corrosive property, but there is a problem with such composition in that the synthesis of the crosslinking agent therefor is not easy and the uncured composition is severely yellowed during storage.

On the other hand, the alcohol-releasing type composition has the advantages that not only is an alkoxysilane, which is the crosslinking agent, available at a low cost but also, since the released material is an alcohol, such as methanol, ethanol. etc., while the released material is liable to volatilize off, there is still no problem with odor nor is there a problem with corrosion. On this other hand, the composition has the disadvantages that curing thereof is slow and the storage stability is poor since the alcohol generated by the hydrolysis of the crosslinking agent with a slight amount of water existing in the system during the storage thereof can harm the base polymer, and hence it has been desired to overcome disadvantages.

In particular, a room-temperature curable polyorganosiloxane composition is frequently used as a rubbery elastic body by curing while in contact with a copper series metal for use of an adhesive, coating material, etc., in the electric and electronic industries. Recently, the oxime-releasing type, acetone-releasing type, and alcohol-releasing type compositions have been used for the above-described purpose, but since those compositions have the earlier described disadvantages, it has been desired to develop a room-temperature curable polyorganosiloxane composition free from the disadvantages earlier described.

On the other hand, a one-part type room-temperature curable polyorganosiloxane composition composed of a polyorganosiloxane having alkoxy groups bonded to the terminal silicon atoms, an alkoxysilane, a curing catalyst, and an alcohol scavenger has recently been found and it is disclosed that this composition has good storage stability and has rapid curing capability; it also has been disclosed that a silicon-nitrogen bond containing compound is effective as the alcohol scavenger (PCT Japanese Patent Publication Nos. 59-500219 and 58-501040). Also, a room-temperature curable polyorganosiloxane composition using a silicon-nitrogen bond compound having a hydrolyzable group as the alcohol scavenger so that the compound can be utilized as a crosslinking agent after reacting with the alcohol is disclosed in JP-A-60-135458 (the term "JP-A" as used herein means an "unexamined published Japanese patent application") and a room-temperature curable polyorganosiloxane composition which is improved to show less corrosive property to copper-series metal is disclosed in JP-A-60-123552.

Such room-temperature curable polyorganosiloxane compositions which have a rapid curing property and do not rust copper series metals are used as adhesives and coating materials in the electric and electronic industries. However, recently, in the electric and electronic industries, electric contact hindrance with volatile components (low molecular weight materials) is becoming a serious problem. That is, the volatile components contained in the adhesives and coating materials, such as a low molecular weight siloxane and a small amount of additives as described above (the alcohol scavenger, etc.) volatilize from the composition during curing and from the surface of the cured material after curing to sometimes cause electric contact hindrance. Hence, a countermeasure for the problem has been desired.

SUMMARY OF THE INVENTION

As a result of various investigations to obtain a room-temperature polyorganosiloxane composition which has good storage stability, can be cured in a relatively short time at room temperature, and which has a lesser possibility of causing electric contact hindrance without any reduction in the advantages of causing no corrosion of copper series metals, it has been found that the use of a polycondensation reaction product of an amino group-containing silane and a silazane is effective. The present invention has been attained based on this finding.

Accordingly, an object of the present invention is to provide a room-temperature curable polyorganosiloxane composition which cures at room temperature upon contact with moisture in air to form an elastic body.

The room-temperature curable polyorganosiloxane composition of the present invention comprises the following components (A) to (C):

(A) 100 parts by weight of a mixture of
(1) a terminally reactive polyorganosiloxane represented by the formula

$$R^1_a(R_2O)_{3-a}SiZ[R_2SiO]_nSiR^1_2ZSi(OR^2)_{3-a}R^1_a$$

wherein R and $R^1$ which may be the same or different, each represents a monovalent substituted or unsubstituted hydrocarbon group; $R^2$ represents a hydrogen atom or a monovalent group selected from the group consisting of an alkyl group having from 1 to 4 carbon atoms and an alkoxyalkyl group having from 1 to 6 carbon atoms; a represents a number of from 0 to 2; Z represents an oxygen atom or a divalent hydrocarbon group which may have an oxygen atom, a sulfur atom, or a nitrogen atom between the carbons thereof; and n represents a number such that the viscosity of the compound at 25° C. ranges from 50 to 1,000,000 cP, and
(2) a silane represented by the following formula $$R^3_bSi(OR^4)_{4-b}$$

wherein $R^3$ represents a monovalent substituted or unsubstituted hydrocarbon group; $R^4$ represents a monovalent group selected from the group consisting of an alkyl group having from 1 to 4 carbon atoms and an alkoxyalkyl group having from 1 to 6 total carbon atoms; and D represents a number of 0 or 1, or a partially hydrolyzed condensation product thereof, and the amount of (A) (1) being from 85 to 100 parts by weight, (B) from 0.01 to 20 parts by weight of a curing catalyst, and (C) from 0.5 to 20 parts by weight of a polycondensation reaction product of an amino group-containing silane represented by the following formula

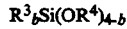

$$X_cSi(WNH_2)Y_{3-c}$$

and a silazane represented by the following formula

$$X_dY_{3-d}SiNHSiY_{3-d}X_d$$

wherein W represents a substituted or unsubstituted organic group having at least 2 carbon atoms; X represents a hydrolyzable group, selected from the group consisting of an alkoxy group, an amido group, a carbamato group, an enoxy group, an isocyanato group, and a ureido group; Y represent a monovalent substituted or unsubstituted hydrocarbon group having from 1 to 13 carbon atoms; c represents a number of from 1 to 3; and d represents a number of from 0 to 3.

DETAILED DESCRIPTION OF THE INVENTION

Figure 1:
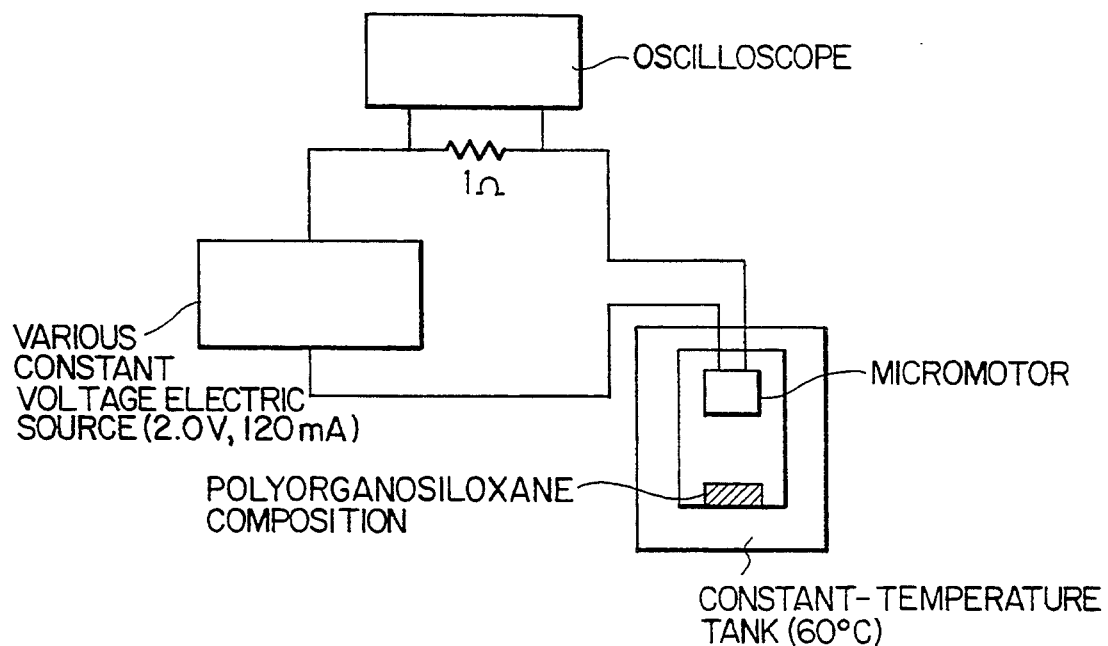
FIG. 1 is a schematic view explaining the state of the actual test by a micromotor using the variable constant voltage electric source conducted in the Examples.

The present invention is described in detail below.

The component (A)(1) used in the present invention is a base polymer of the composition of the present invention and is shown by the formula described above.

In the formula showing the component (A)(1), the R groups, which may be the same or different, represent an alkyl group such as methyl, ethyl, propyl, butyl, hexyl, decyl, etc.; an alkenyl group such as vinyl, allyl, etc.; an aryl group such as phenyl, etc.; an aralkyl group such as β-phenylethyl, β-phenylpropyl, etc.; or those hydrocarbon groups a part of the hydrogen atoms of which is substituted with a halogen atom, a nitro group, etc. R is preferably methyl, vinyl, or phenyl from the view of the ease of the synthesis of the compound. Other organic groups are selectively used only in the case of giving a specific property such as oil resistance and coatability to a rubbery elastic body formed after curing the composition.

In the case of methyl as an R group or as R groups, not only can the polyorganosiloxane be easily obtained but also the viscosity and the degree of polymerization of the siloxane is low. Further, the extrusion workability of the composition before curing and the properties of the rubbery elastic body formed after curing are well balanced. It is thus preferred that at least 85% of all of the organic groups be methyl groups and it is more preferred that substantially all of the organic groups be methyl groups. However, when it is necessary to impart heat resistance and cold resistance to the rubbery elastic body formed after curing the composition, it is preferred to use a phenyl group as a part of the organic groups.

$R^1$ in the formula represents the same organic groups as shown by R described above. $R^1$ is preferably methyl or vinyl from the view of ease of synthesis of the terminally reactive polyorganosiloxane obtained and the high crosslinking reaction rate of the room temperature curable polyorganosiloxane composition obtained.

$R^2$ in the formula is a hydrogen atom, an alkyl group such as methyl, ethyl, propyl, butyl, etc., or an alkoxyalkyl group such as methoxyethyl, ethoxyethyl, etc., and $R^2$ is preferably methyl from the view of ease of synthesis of the terminally reactive polyorganosiloxane and the high crosslinking reaction rate.

In the present invention, for imparting proper extrudability to the composition before curing and excellent mechanical characteristics to the rubbery elastic body formed after curing, it is necessary that the viscosity of the terminal reactive polyorganosiloxane at 25° C. is in the range of from 50 to 1,000,000 cP. If the viscosity of the terminal reactive polyorganosiloxane is less than 50 cP, the elongation of the rubbery elastic body after curing is insufficient, while if the viscosity thereof is over 1,000,000 cP, it is difficult to obtain a uniform composition and extrudability is decreased. The particularly preferred viscosity is in the range of from 500 to 200,000 cP from the view of balancing the properties required for the composition before curing and the composition after curing.

The silane of (A)(2) or the partially hydrolyzed condensation product thereof used in the present invention functions as a crosslinking agent for curing the composition by reacting with the alkoxy group of the component (A)(1) in the presence of water and the curing catalyst (B) and is shown by the formula $$R^3{}_b Si(OR^4)_{4-b}$$

wherein $R^3$, $R^4$, and b are the same as defined above.

In the above formula, $R^3$ can represent the same groups as the organic groups $R^1$ directly bonded to the silicon atoms of the component (A)(1), and methyl or vinyl is preferred from the view of easy availability and the curing speed. Also, $R^4$, can represent the same groups as $R^2$ of the component (A)(1).

Examples of the compound of (A)(2) are tetramethoxysilane, methyltrimethoxysilane, ethyltrimethoxysilane, vinyltrimethoxysilane, phenyltrimethoxysilane, tetraethoxysilane, methyltriethoxysilane, methyltriisopropoxysilane, phenyltriethoxysilane, tetrakis(ethoxyethoxy)silane,methyltris(methoxyethoxy)silane, vinyltris(methoxyethoxy)silane, and siloxanes which are partially hydrolyzed condensation products of those silanes.

In those compounds, tetramethoxysilane, vinyltrimethoxysilane, methyltris(methoxyethoxy)silane, vinyltris(methoxyethoxy)silane, etc., are particularly preferably used from the points of the ease of synthesis thereof and increasing the curing speed of the composition without decreasing the storage stability thereof.

The component (A) is the base polymer (A)(1) alone, which may have a crosslinking property by itself, or a mixture of the component (A)(1) and the crosslinking agent (A)(2). The proportions thereof in the component (A) are such that the content of the component (A)(1) ranges from 85 to 100% by weight and the content of the component (A)(2) ranges from 0 to 15% by weight. If the content of the component (A)(2) is over 15% by weight, the component (A)(2) tends to separate from the composition during storage, the composition greatly shrinks at curing, and the properties of the rubbery elastic body obtained are decreased.

When on the average more than 2 alkoxy groups per one molecule of the component (A)(1) are bonded to the terminal silicon atoms of the polyorganosiloxane used as the component (A)(1), the reaction of the composition proceeds in the presence of water and the curing catalyst without the silane (A)(2) or the partially hydrolyzed condensation product thereof. However, considering the balance of the curing property and the mechanical property after curing, it is preferred that the content of the component (A)(2) in the component (A) ranges from 0.4 to 5% by weight.

The component (B) used in the present invention is a curing catalyst for obtaining a rubbery elastic body by reacting the component (A)(1) alone or a mixture of the component (A)(1) and the component (A)(2) in the presence of water. Examples of the curing catalyst are carboxylic acid metal salts such as iron octenoate, cobalt octenoate, manganese octenoate, zinc octenoate, tin naphthenate, tin caprylate, tin oleate, etc., and organotin compounds such as dibutyltin acetate, dibutyltin dioctenoate, dibutyltin dilaurate, dibutyltin dioleate, diphenyltin diacetate, dibutyltin oxide, dibutyltin methoxide, dibutylbis(triethoxysiloxy)tin, dioctyltin dilaurate, etc. The organotin compounds are preferred since the presence of a slight amount thereof gives a large catalytic activity.

The amount of the component (B) compounded is in the range of from 0.01 to 20 parts by weight, and preferably from 0.1 to 1 part by weight, per 100 parts by weight of the component (A). If the content of the component (B) is less than 0.01 part by weight, the component does not sufficiently function as the curing catalyst and not only is a long time required for curing but also curing at the deep portion of the rubbery body far from the contact surface with air is insufficient, while if the content thereof is over 20 parts by weight, the storage stability of the composition becomes poor.

The component (C) used in the present invention is the characteristic component of the present invention. The component (C) which scavenges an alcohol generated at the production of a mixed composition of the component (A) and the component (B) described above or during storing the composition in a closed container, thereby improves the storage stability of the composition and prevents occurrence of electric contact hindrance.

The component (C) is a polycondensation reaction product of the amino group-containing silane represented by the formula $$X_c Si(WNH_2)Y_{3-c}$$

and the silazane represented by the formula $$X_d Y_{3-d} SiNHSiY_{3-d} X_d$$

wherein W, X, Y, c, and d are the same as defined above.

Examples of the amino group-containing silane which is one of the materials constituting the component (C) are γ-aminopropyltripropyltrimethoxysilane, γ-aminopropyltriethoxysilane, γ-aminopropyltripropoxysilane, γ-aminopropyltriisopropoxysilane, γ-aminopropyltributoxysilane, γ-aminopropyltri-t-butoxysilane, γ-aminopropyltriacetoamidosilane, γ-aminopropyltriisocyanatosilane, γ-aminopropyltris(N,N-dimethyl-N-methylureido)silane, γ-aminopropyltris(N,N-dimethyl-N-butylureido)silane, γ-aminoethyltrimethoxysilane, γ-aminobutyltrimethoxysilane, γ-aminopentyltrimethoxysilane, γ-aminoethylaminopropyltrimethoxysilane, and β-aminoethylaminopropyltriethoxysilane.

Examples of the silazane which is another constituting component are hexamethyldisilazane, hexaethyldisilazane, hexapropyldisilazane, 1,3-divinyltetramethyldisilazane, 1,3-dimethoxytetramethyldisilazane, 1,3-diethoxytetramethyldisilazane, 1,3-ditriacetamidotetramethyldisilazane, and 1,3-diisocyanatotetramethyldisilazane.

For the synthesis of the polycondensation reaction product, only one amino group-containing silane and only one silazane described above may be used or a mixture of two or more thereof may be used.

In the above-described compounds, the preferred amino group-containing silane is γ-aminopropyltrimethoxysilane or γ-aminopropyltriethcxysilane and the preferred silazane is hexamethyldisilazane, from the view of the cost for the materials and the ease of their availability and synthesis.

For accelerating the synthesis reaction of the polycondensation reaction product, an acid type catalyst such as ammonium sulfate and ammonium chloride or a chlorosilane capable of forming ammonium chloride in the reaction system may be used. With respect to those additives, use of the chlorosilane is preferred since it has good compatibility with the raw materials and therefore can be easily mixed therewith, and a good polycondensation reaction can be conducted.

The polycondensation reaction is generally conducted by mixing the amino group-containing silane and the silazane, adding a catalyst thereto, then heating and mixing the mixture. It is necessary to conduct the polycondensation reaction to achieve a high degree of polymerization, not merely conduct a simple condensation reaction. For conducting such a good polycondensation reaction, it is preferred that the amino group-containing silane is reacted with the silazane under heating in the presence of a catalyst and after distilling off low-boiling components, reaction is further conducted under heating. In this case, the 2nd heat reaction may be conducted simultaneously with the distillation off of the low-boiling components.

It is considered that by the 1st heat reaction, the condensation reaction of the amino group-containing silane and the silazane is conducted and by distilling off low-boiling components and the polymerization proceeds well by the 2nd heat reaction. For example, the 1st heat reaction is conducted at a temperature of at least 50° C. for at least 2 hours, and preferably at a temperature of from 60° to 150° C. for from 10 to 40 hours, and the 2nd heat reaction is conducted at a temperature of at least 50° C. for at least one hour, and preferably at a temperature of from 60° to 150° C. and for from 3 to 40 hours. The silazane may be added in discrete portions to the silane, if desired. It is preferred that the silazane is added at the 1st heat reaction and at the 2nd bean reaction separately since the reaction proceeds well in such a case. Furthermore, after conducting the polycondensation reaction, final low-boiling components are distilled off. In this case, it is preferred to conduct the distillation until the content of low-boiling components having a vapor pressure at 20° C. of 0.2 mm Hg or more becomes 2.0% by weight or less, in particular 1.2% by weight or less.

In general, the reaction is conducted using the silazane at a ratio of from 0.5 to 4.0 mols, and preferably from 0.8 to 1.5 mols, per mole of the amino group-containing silane. When the silazane is added in discrete portions, it is preferred to use 10 to 50 mol % thereof, in particular 20 to 40 mol % thereof, at the 1st addition.

The catalyst is used in an amount ranging from 0.1 to 10 parts by weight, end preferably from 0.5 to 5 parts by weight, per 100 parts by weight of the amino group-containing silane.

By conducting such a polycondensation reaction, a reaction product having a desirable degree of polymerization is obtained. The reaction products thus obtained are compounds each having at least 2, and preferably at least 6, of the following structural unit in the molecule:

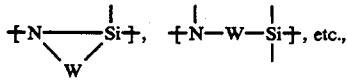

and examples thereof are compounds represented by the following structural formula

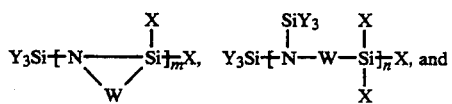

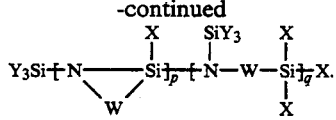

In the above formulae, m, n, p, and q are numbers satisfying m>2, n>2, and p+q>2, and W, X, and Y are the same as defined above.

The compound obtained generally has a viscosity ranging from 30 to 10,000 cP, and the compound having a viscosity ranging from 50 to 400 cP is preferably used since such a compound does not have a corrosive property or cause much electric contact hindrance, and has good workability. For the same reasons, the compound having a molecular weight ranging from 300 to 100,000, and preferably from 1,000 to 10,000, is used.

A method of obtaining the alkoxy group-containing silazane as an alcohol scavenger by the reaction of chlorosilane and ammonia is known as disclosed in, for example, JP-A-60-135458. However, by this method it is generally difficult to obtain a polysilazane having a high degree of polymerization and also it is difficult to obtain the compound having the viscosity and the molecular weight as defined in the present invention. Further, the composition using the alcohol scavenger obtained by the above method is inferior to the composition of the present invention in the point of the anticorrosive property to copper, etc.

The amount of the component (C) compounded ranges from 0.5 to 20 parts by weight, and preferably from 1 to 10 parts by weight, per 100 parts by weight of the component (A). If the amount of the component (C) compounded is less than 0.5 part by weight, the storage stability of the composition is decreased, while if the amount thereof is over 20 parts by weight, the use of such a large amount provides no additional benefits and is also uneconimical; further, the physical properties and the heat resistance of the rubbery elastic body obtained by curing the composition are decreased and yellowing by heating becomes severe.

In the present invention, for imparting proper flowability to the composition before curing and imparting high mechanical strength as required in the case of use as, for example, a sealant, etc., to the rubbery elastic body formed after curing, it is preferred to add an inorganic filler which is a fine powder to the composition as a reinforcing agent in addition to the above-described components. Examples of such an inorganic filler are fumed silica, burned silica, precipitated silica, fumed titania and those fillers the surfaces of which are rendered hydrophobic with organochlorosilanes, polyorganosiloxanes, hexamethyldisilazane, etc. Examples of other fillers are calcium carbonate, organic acid-surface treated calcium carbonate, diatomaceous earth, ground silica, aluminosilicate, magnesia, alumina, etc. When it is required to have a particularly low modulus as a sealant for buildings, it is preferred to use a non-reinforcing filler in those fillers.

If the amount of the reinforcing inorganic filler added is too small, the effect of improving the mechanical characteristics is scarcely obtained, while if the amount thereof is too large, a modulus becomes large and the elongation at break becomes small. Accordingly, it is desirable that the amount of the filler added is properly selected in the range of from 1 to 500 parts by weight, and preferably from 5 to 150 parts by weight, per 100 parts by weight of the component (A).

Furthermore, to the composition of the present invention there can be added various additives such as a pigment, a thixotropy-imparting agent, a viscosity modifier for improving extrusion workability, an ultraviolet preventing agent, an antibacterial agent, a heat resistance improving agent, an adhesion improving agent, a flame retardant, a surface resinification preventing agent, etc.

The composition of the present invention can be prepared by mixing all the components described above together with, if necessary, various kinds of additives in a humidity free state.

The composition obtained is used as a so-called one-part type room-temperature curable polyorganosiloxane composition which is stored as is in a closed container and is first cured at the use thereof by contacting with the moisture in air.

The composition of the present invention can also be used as a so-called two-part type room-temperature curable polyorganosiloxane composition wherein the components (A) and (C) and the component (B) are stored in separate containers and they are mixed at the use thereof.

The room-temperature curable polyorganosiloxane composition of the present invention has a rapid curing property, has no corrosive property to copper series metals, and has very little likelihood of causing electric contact hindrance. Accordingly, the composition of the present invention can be suitably used as elastic adhesives and coating compositions in various industries, in particular, in electric and electronic industries.

The present invention is explained in more detail by reference to the following Examples, but the invention is not limited by those examples. In addition, in the examples, all parts are, unless otherwise indicated, by weight and the values for physical properties such as the viscosity, etc., are values measured at 25° C. and 60% in relative humidity.

SYNTHESIS EXAMPLE 1

Production of polycondensation reaction product (C) of γ-aminopropyltrimethoxysilane and hexamethyldisilazane:

The inside atmosphere of a four neck round bottom flask equipped with a thermometer, a stirrer, a reflux condenser, and an inlet and an outlet for a nitrogen gas was replaced with nitrogen gas, and 358 g (2 mols) of γ-aminopropyltrimethoxysilane, 129 g (0.8 mol) of hexamethyldisilazene, and 7.0 g of trimethylchlorosilane were placed in the reaction flask. After refluxing the mixture at 90° C. for about 20 hours, low-boiling components were distilled off at 90° C. for 3 hours. 193 g (1.2 mols) of hexamethyldisilazane was further added to the reaction mixture. After refluxing the mixture at 90° C. for 5 hours, the reaction mixture was cooled and filtered, and reaction by-products formed were distilled off to obtain a light-yellow transparent polycondensation reaction product of γ-aminopropyltrimethoxysilane and hexamethyldisilazane having a content of low-boiling components having a vapor pressure at 20° C. of at least 0.2 mm Hg of 1.0% by weight, a viscosity of about 1,000 cP, and a molecular weight of about 5,500.

The infrared spectra (IR) and the nuclear magnetic resonance spectra (NMR) of the product obtained are as follows and the product is referred to as C-1.

IR: Si-Me; 1250 cm$^{-1}$ and 840 cm$^{-1}$, SiOMe; 1080 cm$^{-1}$, CH$_2$—; 2930 cm$^{-1}$ and 2820 cm$^{-1}$, —NH; 3370 cm$^{-1}$.

NMR: Si-CH$_3$; 0.1 ppm, Si-CH$_2$; 0.8 ppm, CH$_2$CH$_2$; 1.9 ppm, CH$_2$N; 3.1 ppm SiOCH$_3$; 3.7 ppm.

It was confirmed from the analytical results that the product had an average structural formula represented by

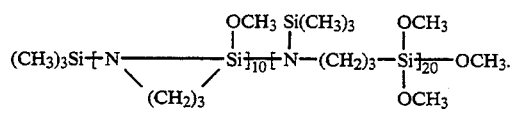

SYNTHESIS EXAMPLE 2

Production of polycondensation reaction product (C) of γ-aminopropyltriethoxysilane and hexamethyldisilazane:

In the flask used in Synthesis Example 1 were placed 442 g (2.0 mols) of γ-aminopropyltriethoxysilane, 113 g (0.7 mol) of hexamethyldisilazane, and 20 g of ammonium sulfate. After heating the mixture to 120° C. for about 24 hours, low-boiling components were distilled off at 120° C. and 20 mm Hg for 30 minutes. 209 g (1.3 mols ) of hexamethyldisilazane was further added to the reaction mixture. After refluxing the resulting mixture at 120° C. for 5 hours, the reaction mixture was cooled and filtered, and reaction by-products formed were distilled off to obtain a polycondensation reaction product having a content of low-boiling components having a vapor pressure at 20° C. of at least 0.2 mm Hg of 0.8% by weight, a viscosity of about 800 cP, and a molecular weight of about 3,300.

The infrared spectra and the nuclear magnetic resonance spectra of the product are shown below and the product is referred to as C-2.

IR: Si-Me; 1250 cm$^{-1}$ and 840 cm$^{-1}$, SiOEt; 1080 cm$^{-1}$, CH$_2$—; 2940 cm$^{-1}$, —NH; 3360 cm$^{-1}$.

NMR: Si-CH$_3$: 0.1 ppm, Si-CH$_2$; 0.8 ppm, SiCH$_2$CH$_2$; 1.8 ppm, CH$_2$N; 3.0 ppm, SiOCH$_2$; 3.9 ppm, SiOCH$_2$CH$_3$; 1.2 ppm.

It was confirmed from the analytical results that the product had an average structural formula represented by

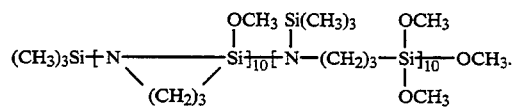

SYNTHESIS EXAMPLE 3

Production of polycondensation reaction product (C) of γ-aminopropyltriethoxysilane and 1,3-dimethoxytetramethyldisilazane:

In the flask used in Synthesis Example 1 were placed 442 g (2.0 mols) of γ-aminopropyltriethoxysilane, 154 g (0.8 mol) of 1,3-dimethoxytetramethyldisilazane, and 20 g of ammonium sulfate. After heating the mixture to 120° C. for about 30 hours, low-boiling components were distilled off at 120° C. for 2 hours. 232 g (1.2 mols) of 1,3-dimethoxytetramethyldisilazane was further added to the reaction mixture. After refluxing the resulting mixture at 120° C. for 5 hours, the reaction mixture was cooled and filtered, and reaction by-products were distilled off to obtain a yellow transparent condensation reaction product having a content of low-boiling components having a vapor pressure at 20° C. of at least 0.2 mm HG of 1.2% by weight, a viscosity of about 600 cP, and a molecular weight of about 2,200.

The infrared spectra and the nuclear magnetic resonance spectra of the product meansured are as follows and the product is referred to as C-3.

IR: Si-Me; 1250 cm$^{-1}$ and 840 cm$^{-1}$, SiOEt; 1080 cm$^{-1}$, —CH$_2$—; 2940 cm$^{-1}$ and 2830 cm$^{-1}$, —NH; 3360 cm$^{-1}$.

NMR: Si-CH$_3$; 0.1 ppm, Si-CH$_2$; 0.8 ppm, SiCH$_2$CH$_2$; 1.8 ppm CH$_2$N; 3.0 ppm, SiOCH$_2$; 3.9 ppm, SioCH$_3$; 3.7 ppm, SiOCH$_2$CH$_3$; 1.2 ppm.

It was confirmed from the analytical results that the product had an average structural formula represented by

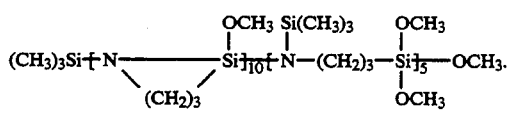

EXAMPLE 1

14 Parts of fumed silica having a specific surface area of 200 m$^2$/g were added to 100 parts of α,ω-bis(methyldimethoxysilyl)polydimethylsiloxane, and the resulting mixture was uniformly mixed to obtain a base compound A-1. 100 Parts of the base compound A-1 was uniformly mixed with 1.5 parts of methyltrimethoxysilane, 0.3 part of dibutyltin dilaurate, and 2 parts of C-1 obtained in Synthesis Example 1 in a humidity-free state and defoamed. The composition thus obtained was extruded into a sheet form having a thickness of 2 mm and cured by the humidity in the air. After 5 minutes, the sheet to have became a tack-free state and after allowing it to stand for 168 hours, when the physical properties thereof were measured in accordance with JIS K 6301, the hardness was 25, the tensile strength was 16 kgf/cm$^2$, and the elongation was 440%.

Also, the composition was placed in a closed container which excluded moisture, heated to 70° C. for 5 days, and then extruded into a sheet form having a thickness of 2 mm, followed by curing with the humidity in the air. After about 5 minutes, the sheet became to have a tack-free state. When the sheet was allowed to stand for 168 hours and the physical properties thereof were measured, the hardness was 24, the tensile strength was 16 kgf/cm$^2$, the elongation was 430%. Thus, no deterioration was observed as compared with the composition before heating, which showed the good storage stability of the composition.

The tensile shearing adhesive strength of the composition on copper, aluminum, an acrylic resin, and polycarbonate as an article to be adhered was measured by the method of JIS K 6850 and the adhesive states were observed. The results obtained are shown in Table 1 below.

On the composition thus obtained, an actual test was carried out in a constant-temperature atmosphere of 60° C. by a micromotor using a variable constant voltage electric source (2.0 V, 120 mA) as shown in FIG. 1. The wave form of the micromotor was observed using an oscilloscope and when the wave form of the micromotor became abnormal, it was determined that an electric contact hindrance occurred and the extent of the electric contact hindrance at that time was evaluated. The results obtained are shown in Table 1 below.

Figure 2:
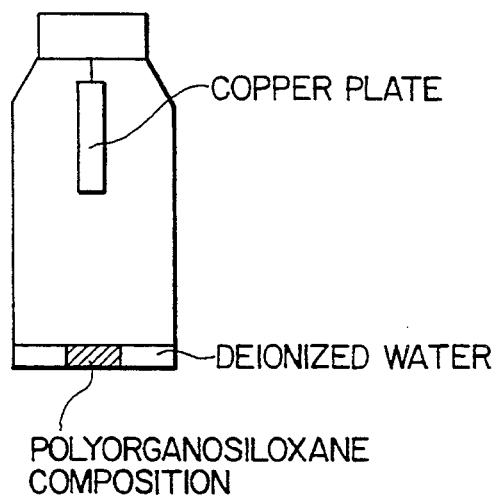
FIG. 2 is a schematic view showing the state of the corrosion test to copper conducted in the Examples.

The corrosive property of the composition on copper was tested as shown in FIG. 2. That is, 15 g of the composition obtained was placed in a 500 ml glass bottle containing 10 g of deionized water, and a copper plate having a thickness of 1 mm, the surface of which was polished to expose the active surface, was hung at the upper portion of the bottle as shown in FIG. 2. After closing the bottle, the corrosive test was carried out by heating to 40° C. for 168 hours, and the corrosive property of the composition was evaluated by comparison with a blank test which was the same test except that the composition was not placed in the bottle. The results obtained are shown in Table 1 below.

COMPARATIVE EXAMPLE

Sample 1 was prepared by compounding 100 parts of the base compound A-1 used in Example 1 with 1.5 parts of methyltrimethoxysilane, 0.3 part of dibutyltin dilaurate, and 3 parts of hexamethyldisilazane in the same manner as in Example 1. Sample 2 was prepared in the same manner as above except that 2 parts of methylvinyldiacetamidosilane was used in place of hexamethyldisilazane. Sample 3 was prepared in the same manner as above except that 4 parts of N-trimethylsilyl-γ-aminopropyltrimethoxysilane was in used place of hexamethyldisilazane. Sample 4 was prepared in the same manner as above except that 1,1-dimethoxy-2-trimethylsilyl-1-sila-2-azacyclopentane was used in place of hexamethyldisilazane. Sample 5 was prepared in the same manner as above except that no compound was used in place of hexamethyldisilazane.

Using each of the samples 1 to 5, the same evaluations as in Example 1 were made. The results obtained are shown in Table 1 below.

EXAMPLE 2

14 Parts of fumed silica having a specific surface area of 200 m$^2$/g were added to 100 parts of α,ω-bis(methyldimethoxysilyl)polydimethylsiloxane having a content of low-molecular weight siloxane having a vapor pressure at 20° C. of at least 0.01 mm Hg of 0.01% by weight and a viscosity of 20,000 cP. The resulting mixture was uniformly mixed to obtain a base compound A-2. 100 Parts of the base compound A-2 was compounded with 1.5 parts of methyltrimethoxysilane, 0.3 part of dibutyltin dilaurate, and 2 parts of C-1 obtained in Synthesis Example 1 in the same manner as in Example 1 to obtain a composition. On the composition obtained, the same evaluations as in Example 1 were made. The results obtained are shown in Table 1 below.

EXAMPLE 3

14 Parts of fumed silica having a specific surface area of 200 m$^2$/g were added to 100 parts of α,ω-bis(methyldimethoxysilyl)polydimethylsiloxane. The resulting mixture was uniformly mixed to obtain a base compound A-3. 100 Parts of the base compound A-3 was compounded with 1.2 parts of tetramethoxysilane, 0.2 part of dibutyltin dilaurate, and 2 parts of C-2 obtained in Synthesis Example 2 in the same manner as in Example 1 to, obtain a composition. On the composition obtained, the same evaluations as in Example 1 were made. The results obtained are shown in Table 1 below.

EXAMPLE 4

15 Parts of fumed silica having a specific surface area of 200 cm²/g were added to 100 parts of α,ω-bis(-phenyldimethoxysilyl)polydimethylsiloxane comprising 11 mol % of a diphenylsiloxane unit and residual dimethylsiloxane unit, both having terminals each blocked with a phenyldimethoxysilyl group, and having a viscosity of 20,000 cP. The resulting mixture was uniformly mixed to obtain a base compound A-4. 100 Parts of the base compound A-4 was compounded with 1.5 parts of phenyltrimethoxysilane, 0.2 part of dibutyltin dilaurate, and 2.2 parts of C-1 obtained in Synthesis Example 1 in the same manner as in Example 1 to obtain a composition. On the composition obtained, the same evaluations as in Example 1 were made. The results obtained are shown in Table 1.

EXAMPLE 5

100 Parts of the base compound B-1 used in Example 1, 1.5 parts of methyltrimethoxysilane, 0.2 part of dibutyltin dilaurate, and 2.2 parts of C-3 obtained in Synthesis Example 3 were compounded in the same manner as in Example 1 to obtain a composition. On the composition obtained, the same evaluations as in Example 1 were made. The results obtained are shown in Table 1 below.

TABLE 1

| | Example 1 | Comparative Example | | | | |
| --- | --- | --- | --- | --- | --- | --- |
| | | Sample 1 | Sample 2 | Sample 3 | Sample 4 | Sample 5 |
| Physical Property of Rubber | | | | | | |
| Initial Property | | | | | | |
| Tack-free time (min.) | 5 | 9 | 7 | 5 | 5 | 9 |
| Hardness (JIS A) | 25 | 23 | 24 | 26 | 25 | 22 |
| Tensile strength (kgf/cm²) | 16 | 14 | 15 | 17 | 15 | 14 |
| Elongation (%) | 440 | 460 | 470 | 420 | 430 | 480 |
| Physical properties after heating at 70° C. for 5 days | | | | | | |
| Tack-free time (min.) | 5 | 12 | 9 | 6 | 5 | not cured |
| Hardness (JIS A) | 24 | 20 | 22 | 24 | 24 | Measurement impossible |
| Tensile strength (kgf/cm²) | 16 | 14 | 15 | 17 | 14 | Measurement impossible |
| Elongation (%) | 430 | 480 | 480 | 430 | 420 | Measurement impossible |
| Time until turbidity occurs in the wave form of oscilloscope (hr) | 3000 or more | 1000 | 1000 | 750 | 500 | 3000 or more |
| Adhesive Property | | | | | | |
| Tensile shearing adhesive strength (kgf/cm²) The numeral in ( ) is cohesive failure (%) Article to be adhered | | | | | | |
| Copper | 12(100) | 9(100) | 12(100) | 7(100) | 11(100) | 7(100) |
| Aluminum | 11(100) | 9(100) | 10(100) | 8(100) | 10(100) | 8(100) |
| Acrylic resin | 9(100) | 7(100) | 8(100) | 3(100) | 9(100) | 3(100) |
| Polycarbonate | 11(100) | 7(100) | 10(100) | 6(100) | 10(100) | 6(100) |
| Corrosive property to copper | No abnormal | Changed into reddish brown | No abnormal | No abnormal | No abnormal | No abnormal |

| | Example 2 | Example 3 | Example 4 | Example 5 |
| --- | --- | --- | --- | --- |
| Physical Property of Rubber | | | | |
| Initial Property | | | | |
| Tack-free time (min.) | 5 | 5 | 8 | 5 |
| Hardness (JIS A) | 26 | 31 | 34 | 26 |
| Tensile strength (kgf/cm²) | 17 | 17 | 14 | 17 |
| Elongation (%) | 430 | 330 | 280 | 430 |
| Physical properties after heating at 70° C. for 5 days | | | | |
| Tack-free time (min.) | 5 | 5 | 8 | 5 |
| Hardness (JIS A) | 25 | 30 | 35 | 25 |
| Tensile strength (kgf/cm²) | 17 | 17 | 15 | 17 |
| Elongation (%) | 430 | 340 | 270 | 440 |
| Time until turbidity occurs in the wave form of oscilloscope (hr) | 4000 or more | 3000 or more | 3000 or more | 3000 or more |
| Adhesive Property | | | | |
| Tensile shearing adhesive strength (kgf/cm²) The numeral in ( ) is cohesive failure (%) Article to be adhered | | | | |
| Copper | 12(100) | 9(100) | 9(100) | 11(100) |
| Aluminum | 11(100 | 10(100) | 11(100) | 10(100) |
| Acrylic resin | 10(100) | 8(100) | 8(100) | 10(100) |

| | | | | |
|---|---|---|---|---|
| Polycarbonate | 11(100) | 9(100) | 8(100) | 11(100) |
| Corrosive property to copper | No abnormal | No abnormal | No abnormal | No abnormal |

While the invention has been described in detail and with reference to specific embodiments thereof, it will be apparent to one skilled in the art that various changes and modifications can be made therein without departing from the spirits and scope thereof.

What is claimed is:

1. A room-temperature curable polyorganosiloxane composition comprising the following components (A) to (C):

(A) 100 parts by weight of a mixture of (1) a terminally reactive polyorganosiloxane represented by the formula $$R^1{}_a(R_2O)_{3-a}SiZ[R_2SiO]_nSiR^1{}_2ZSi(OR^2)_{3-a}R^1{}_a$$

wherein R and $R^1$, which may be the same or different, each represents a monovalent substituted or unsubstituted hydrocarbon group; $R^2$ represents a hydrogen atom or a monovalent group selected from the group consisting of an alkyl group having from 1 to 4 carbon atoms and an alkoxyalkyl group having from 1 to 6 carbon atoms, a represents a number of from 0 to 2; Z represents an oxygen atom or a divalent hydrocarbon group which may have an oxygen atom, a sulfur atom, or a nitrogen atom between the carbons; and n represents a number such that the viscosity of the compound at 25° C. ranges from 50 to 1,000,000 cP, and (2) a silane represented by the formula $$R^3{}_bSi(OR^4)_{4-b}$$

wherein $R^3$ represents a monovalent substituted or unsubstituted hydrocarbon group; $R^4$ represents a monovalent group selected from the group consisting of an alkyl group having from 1 to 4 carbon atoms and an alkoxyalkyl group having from 1 to 6 carbon atoms; and b represents 0 or 1, or a partially hydrolyzed condensation product thereof, wherein in component (A) the amount of component (A)(1) is 85 to 100% by weight and the amount of component (A)(2) is 0 to 15% by weight, (B) from 0.01 to 20 parts by weight of a curing catalyst, and (C) from 0.5 to 20 parts by weight of a polycondensation reaction product of an amino group-containing silane represented by the formula $$X_cSi(WNH_2)Y_{3-c}$$

and a silazane represented by the formula $$X_dY_{3-d}SiNHSiY_{3-d}X_d$$

wherein W represents a substituted or unsubstituted organic group having at least 2 carbon atoms; X represents a hydrolyzable group selected from the group consisting of an alkoxy group, an amido group, a carbamato group, an enoxy group, an isocyanato group, and a ureido group; Y independently represents a monovalent substituted or unsubstituted hydrocarbon group having from 1 to 13 carbon atoms; c represents a number of from 1 to 3; and d represents a number of from 0 to 3, wherein said polycondensation reaction is conducted by mixing the amino group-containing silane and the silazane, adding a polycondensation catalyst thereto and heating the mixture at a temperature sufficient to effect the polycondensation reaction of the amino group-containing silane and the silazane.

2. The composition as claimed in claim 1, wherein the terminally reactive polyorganosiloxane has a viscosity of from 500 to 200,000 cP.

3. The composition as claimed in claim 1, wherein the amount of (A)(2) is from 0.4 to 5% by weight based on the weight of sum of A(1) and A(2).

4. The composition as claimed in claim 1, wherein the amount of the curing catalyst is from 0.1 to 1 part by weight.

5. The composition as claimed in claim 1, wherein the curing catalyst is a carboxylic acid metal salt.

6. The composition as claimed in claim 1, wherein the amount of the polycondensation reaction product is from 1 to 10 parts by weight.

7. The composition as claimed in claim 1, wherein the curing catalyst is an organotin compound.

* * * * *